US006945649B2

(12) United States Patent
Dorsch

(10) Patent No.: US 6,945,649 B2
(45) Date of Patent: Sep. 20, 2005

(54) METHOD FOR THE PRODUCTION OF A SPECTACLE GLASS TAKING INTO ACCOUNT THE OPTIMUM INDIVIDUAL LENGTH OF PROGRESSION

(75) Inventor: Rainer Dorsch, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/476,307

(22) PCT Filed: Apr. 30, 2002

(86) PCT No.: PCT/DE02/01567

§ 371 (c)(1),
(2), (4) Date: Apr. 27, 2004

(87) PCT Pub. No.: WO02/088826

PCT Pub. Date: Nov. 7, 2002

(65) Prior Publication Data

US 2004/0169297 A1 Sep. 2, 2004

(30) Foreign Application Priority Data

Apr. 30, 2001 (DE) ......................... 101 21 133

(51) Int. Cl.⁷ ............................. G02C 7/02; G02C 7/06
(52) U.S. Cl. ...................................... 351/177; 351/169
(58) Field of Search ................................ 351/169, 177, 351/168, 170–172

(56) References Cited

U.S. PATENT DOCUMENTS 5,640,775 A * 6/1997 Marshall ........................ 33/28
5,855,074 A * 1/1999 Abitbol et al. ................ 33/507
6,142,627 A 11/2000 Winthrop
6,736,506 B2 * 5/2004 Izumitani et al. ........... 351/204

FOREIGN PATENT DOCUMENTS

EP 0 911 672 4/1999

OTHER PUBLICATIONS

Morgenstern, Sam, "Short Corridor Progressives: Lenses for the New Millennium", VisionCareProduct.com, Jan./Feb. 2001.

* cited by examiner

*Primary Examiner*—Jordan M. Schwartz
(74) *Attorney, Agent, or Firm*—Crowell & Moring LLP

(57) ABSTRACT

A method is described for determining the optical and individual progression length of a continuous vision lens on the basis of the measured cornea/bridge distance of a spectacle frame which is matched in advance.

The invention is distinguished by the following steps:
a) the value of the individual cornea/bridge distance (HSA) of a spectacle frame which has been matched in advance is obtained,
b) the individual distance d between a far reference point $B_F$ and a centering cross $Z_K$ is measured, and
c) the optimum and individual progression length ($L_{opt}$) is determined using the following formula;

$$L_{opt}=0.63*(HSA+13.5 \text{ mm})+d(B_F, ZK).$$

9 Claims, No Drawings

METHOD FOR THE PRODUCTION OF A SPECTACLE GLASS TAKING INTO ACCOUNT THE OPTIMUM INDIVIDUAL LENGTH OF PROGRESSION

TECHNICAL FIELD

This invention relates to a method for determining the optimum and individual progression length of a continuous vision lens on the basis of the measured cornea/bridge distance of a spectacle frame which has been matched in advance.

PRIOR ART

Virtually all lens manufacturers use a product-dependent standard value of approximately 22 mm for the progression length L of continuous vision lenses.

Particularly for frames having a small lens height, some manufacturers additionally offer shorter progression lengths which, in some cases may be only 14 mm.

However, no method is known from the prior art that defines the progression length of a continuous vision lens taking into account the cornea/bridge distance (HSA) of the frame which has been matched in advance.

A standard progression length of 22 mm becomes disadvantageous as soon as the cornea/bridge distance is greater or less than a specific mean value (15 mm), so that the spectacle lens is no longer seated in front of the eye center of rotation on the basis of an empirically determined in-use position. This is also true when shorter progression lengths must be used because of the chosen frame and/or different in-use conditions.

On the basis of the empirically determined in-use position, a fixed progression length of 22 mm is optimum only for a mean HSA of 15 mm. For a shorter HSA, the view must be lowered further downwards, and if the HSA is higher, the near reference point is reached with a reduced viewing deflection.

On the basis of empirical values, the view is lowered with respect to the horizontal viewing deflection through approximately 32 degrees when reading (which is generally found to be acceptable for most users). If, on the basis of the frame chosen by the end user, the HSA differs from the standard HSA, the viewing deflection to achieve full addition or to look through the near reference point $B_N$ no longer corresponds to the empirically determined in-use position. This may necessitate holding the head in an unpleasant position or moving the eyes in an unpleasant manner for the wearer of continuous vision lenses. If the HSA is relatively small (for example 10 nm), the head or the eyes must be lowered (if this is possible at all), while if the HSA is greater (for example 20 mm), the head or the eyes must be raised unnaturally.

DESCRIPTION OF THE INVENTION

The invention is based on the object of specifying a method by means of which the optimum and individual progression length of a continuous vision lens can be determined on the basis of the measured cornea/bridge distance of a spectacle frame which has been matched in advance, or the discrepancy which results from the measured HSA from a shorter progression length, which is determined for example by the spectacle frame.

The object is achieved by a method as claimed in claim 1, which is characterized by the following steps:

a) The value of the individual cornea/bridge distance (HSA) of a spectacle frame which has been matched in advance is obtained, b) The individual distance d between a far reference point $B_F$ and a centering cross $Z_K$ is measured, and c) The optimum and individual progression length ($L_{opt}$) is determined using the following formula:

$$L_{opt} = \tan(32,3° \pm 1°) * (HSA + 13,5 \text{ mm}) + d(B_F, ZK),$$

The value of 13.5 mm can be varied if the progression length is intended to be shorter than the initially mentioned progression length standard value of 22 mm.

This determined progression length can be reported to the lens manufacturer, who then calculates and produces a continuous vision lens with this individual progression length.

The calculation procedure may, in particular, be as follows:

Three different positions of a spectacle lens are considered, with a fixed progression length, in front of the eye center of rotation Z' corresponding to three different HSAs.

The forward inclination of the plane of the frame is, for example, 0 degrees and the DIN distance between the eye center of rotation and the apex of the cornea is 13.5 mm. $B_F$ denotes the far reference point, $B_N$ denotes the near reference point; the progression length L is the distance between $B_F$ and $B_N$, and ZK denotes the centering cross (in accordance with DIN and ISO).

According to the invention, the optimum, individual progression length is calculated using the following relationship:

The viewing angle α between the near reference point $B_N$ and the centering cross ZK for optimum reading at the near reference point corresponds, with a progression length of 22 mm and an HSA of 15 mm, to approximately 32.3 degrees based on the empirically determined in-use position.

$$\tan(32,3°) = \text{distance}(B_N, ZK)/(HSA + 13,5 \text{ mm})$$

In this case, 13.5 mm is the DIN or ISO distance from the eye center of rotation to the apex of the cornea. Then:

$$L_{opt} = 0,63 * (HSA + 13,5 \text{ mm}) + d(B_F, ZK).$$

If the measured HSA for a frame which has been matched in advance is substituted in the above formula, then this results in the optimum individual progression length of the continuous vision lens.

If the distance between ZK and $B_F$ is 4 mm, this results in an optimum progression length of 18.8 mm for an HSA of 20 mm. This apparently demonstrates the major discrepancies between the individual progression length and the standard progression length of 22 mm.

In addition the forward inclination of the plane of the frame and the strength of the spectacle lens (sphere, cylinder, axis, prism, base) can be taken into account in the individual calculation of the continuous vision lens.

What is claimed is:

1. A method for production of a progressive spectacle lens having at least one progressive surface, in which the at least one progressive surface is calculated taking account of individual data, which includes the cornea/bridge distance, of the spectacle lens, such that, at pronounced parts on a main line including the so-called far reference point, $B_F$, and the near reference point, $B_N$, the spectacle lens has a specific effect which is predetermined by a spectacle prescription, characterized by the following steps:

the individual cornea/bridge distance, HSA, for a spectacle frame, which is selected by the spectacle wearer and is matched in advance, is measured, the optimum, individual progression length, $L_{opt}$, for the spectacle frame which has been matched in advance, which is the distance between the far reference point and the near reference point in the direction of the vertical in the in-use position, is determined by means of the following relationship:

$$L_{opt}=\tan(32.3°\pm1°)*(HSA+13.5 \text{ mm})+d(B_F,ZK),$$

where;

HSA: cornea/bridge distance $d(B_F,ZK)$: Distance between the far reference point and a centering cross the progressive surface of the spectacle lens is calculated such that the determined individual progression length $L_{opt}$ is obtained, and the spectacle lens is manufactured in accordance with the calculated data.

2. The method as claimed in claim 1, characterized in that $3 \text{ mm} \leq d(B_F,ZK) \leq 5 \text{ mm}$.

3. The method as claimed in claim 1, characterized in that, in order to determine the value of $d(B_F,ZK)$ the individual distance d is determined between the far reference point $B_F$, the intersection point of a straight line (0°—viewing direction) which runs through the eye center of rotation Z' and runs horizontally, through the plane of the frame, and a centering cross $Z_K$.

4. The method as claimed in claim 1, characterized in that further individual values are taken into account when determining the value of the optimum individual progression length, $L_{opt}$.

5. The method as claimed in claim 4, characterized in that a further individual value is the forward inclination of the plane of the frame.

6. The method as claimed in claim 4, characterized in that further individual values are the spherical effect, the addition, the astigmatic effect, the axis position, the prism and the base of the prism.

7. The method as claimed in claim 1, characterized by the following association between the cornea/bridge distance HSA and the individual progression length, $L_{opt}$:

| HSA | $L_{opt}$ |
| --- | --- |
| 10 mm | 18.8 mm |
| 15 mm | 22 mm |
| 20 mm | 25.1 mm. |

8. The method as claimed claim 1, characterized in that the progressive surface of the spectacle lens is calculated in the in-use position.

9. The method as claimed in claim 2, wherein d ($B_F$, ZK)=4 mm.

* * * * *